United States Patent [19]

Keener et al.

[11] Patent Number: 5,037,450
[45] Date of Patent: Aug. 6, 1991

[54] METHOD AND APPARATUS FOR DESULFURIZING AND DENITRIFYING COAL

[75] Inventors: Timothy C. Keener; Soon-Jai Khang, both of Cincinnati, Ohio

[73] Assignee: University of Cincinnati, Cincinnati, Ohio

[21] Appl. No.: 508,842

[22] Filed: Apr. 12, 1990

[51] Int. Cl.$^5$ ............................ C10L 9/00; C10L 9/08
[52] U.S. Cl. .......................................... 44/622; 44/602
[58] Field of Search .................................. 44/604, 622

[56] References Cited

U.S. PATENT DOCUMENTS

| 3,640,016 | 2/1972 | Lee et al. | 44/622 |
| 3,909,213 | 9/1975 | Sanders | 44/622 |
| 4,302,207 | 11/1981 | Paspek | 44/604 |
| 4,387,653 | 6/1983 | Voss | 44/604 |
| 4,824,441 | 4/1989 | Kindig | 44/604 |

FOREIGN PATENT DOCUMENTS 3133321 4/1982 Fed. Rep. of Germany ........ 44/604

Primary Examiner—Prince E. Willis
Assistant Examiner—Ellen McAvoy
Attorney, Agent, or Firm—Wood, Herron & Evans

[57] ABSTRACT

An apparatus and process for desulfurizing and denitrifying coal by pyrolysis and subsequently treating the gaseous pyrolysis by-products with a solid sorbent to substantially reduce the release of $SO_x$ gases to acceptable levels. In one aspect of the invention, coal is pyrolyzed in the inner chamber of the desulfurization and denitrification apparatus to drive off the sulfur and nitrogen compounds contained therein. In another aspect of the invention, the gaseous by-products of pyrolysis are treated with a solid sorbent in the outer chamber of the desulfurization and denitrification apparatus to substantially desulfurize those gases. In a further aspect of the invention, the desulfurized gases, which contain nitrogen compounds, are combusted under controlled conditions to minimize the production of $NO_x$ gases.

14 Claims, 1 Drawing Sheet

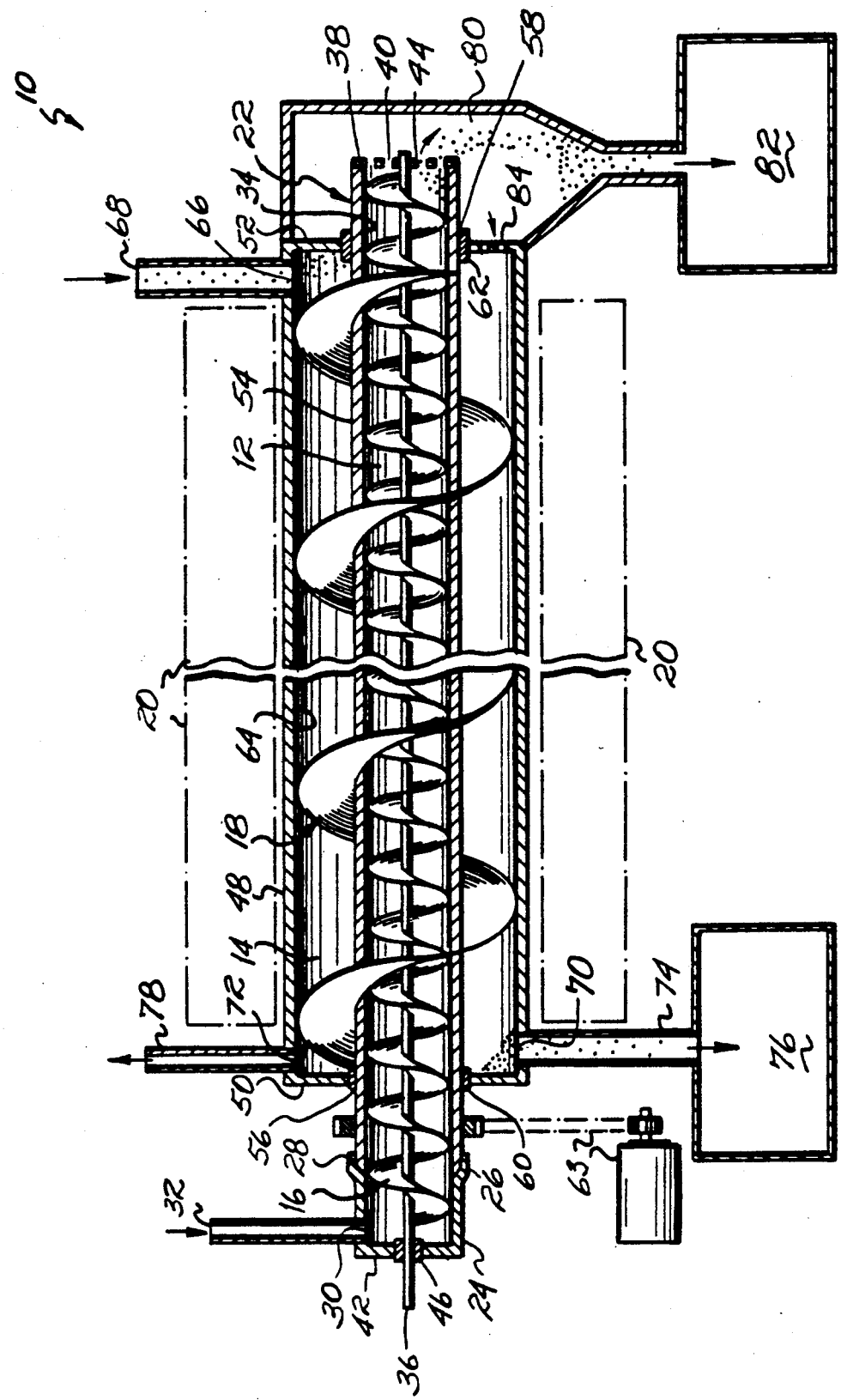

METHOD AND APPARATUS FOR DESULFURIZING AND DENITRIFYING COAL

FIELD OF THE INVENTION

The present invention relates to apparatus and processes for producing low sulfur, low nitrogen coal, and more particularly, to apparatus and processes wherein coal is pyrolized to drive off the sulfur and nitrogen compounds therein, the gaseous pyrolysis by-products are subsequently desulfurized, and the desulfurized gases are combusted.

BACKGROUND OF THE INVENTION

Continued satisfaction of ever-increasing energy demands requires tapping into the vast stores of available coal which have a high sulfur content. One significant drawback to using coal having a high sulfur content is that combustion of the coal produces sulfur dioxide ($SO_2$) and other sulfur oxides (designated generally as "$SO_x$"), which are highly undesirable from an environmental standpoint and require further processing prior to release into the atmosphere.

Coal pyrolysis is a well established means for desulfurizing coal. Pyrolysis entails heating the coal to a temperature sufficiently high to drive off as a gas the sulfur present in the coal without degrading the total heating value of coal or combusting the coal itself. Typically, the sulfur contained in coal is in the form of both organic and inorganic compounds. Pyritic sulfur ($FeS_2$) is released as hydrogen sulfide ($H_2S$) during pyrolysis, according to the following reaction:

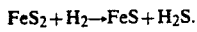

$FeS_2 + H_2 \rightarrow FeS + H_2S$.

Additionally, the moisture in coal reacts with the ferrous sulfide (FeS) to produce mainly hydrogen sulfide, and some sulfur trioxide ($SO_3$), according to the following reactions:

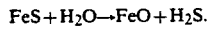

$FeS + H_2O \rightarrow FeO + H_2S$.

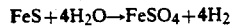

$FeS + 4H_2O \rightarrow FeSO_4 + 4H_2$

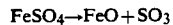

$FeSO_4 \rightarrow FeO + SO_3$

The above reactions take place at or about 400° C.

The release mechanism of organic sulfur compounds from coal is not well understood; however, it is generally known that organic sulfur compounds are released in the form of hydrogen sulfide ($H_2S$) and carbonyl sulfide (COS), at temperatures below about 600° C. It is also known that pyrolysis of coal at 500° C.–600° C. releases up to about 87% of the total sulfur contained in the coal. Coal pyrolysis at or about 500° C. is sufficient to release a minimum of about 50% of the sulfur in the form of $H_2S$ and COS. Subsequent combustion of the sulfur-containing gases ($H_2S$ and COS) produced during pyrolysis results in the formation of various sulfur oxides ($SO_x$), which must be substantially removed from the combustion gases prior to release into the atmosphere.

The removal of sulfur from coal and the removal of the gaseous sulfur by-products from coal-derived flue gas has been the goal of numerous research efforts during the last two decades. Various methods have been attempted and some have been developed to the level of commercialization. However, the cost of current desulfurization technology is still a major drawback to the increased use of coals containing a high level of sulfur and sulfur compounds.

With respect to conventional methods of wet-scrubbing flue gases or the gaseous by-products of coal pyrolysis, the capital costs and/or retrofit costs are extremely high. Dry scrubbing technologies have been developed which could conceivably offer capital cost savings over the conventional wet-scrubbing methods; however, these techniques are disadvantageous in that they do not adequately remove the amount of $SO_x$ desired without using excessive amounts of solid sorbents, due to poor sorbent utilization under flue conditions, i.e., excess oxygen. This poor sorbent utilization produces an enormous amount of scrubber solid waste, which presents its own economic and environmental disadvantages in the disposal thereof.

In addition to the above-noted problems which are due to the presence of sulfur compounds in coal, coal used for fuel may also contain on the order of 1-2% by weight nitrogen compounds which contribute up to about 70% of the oxides of nitrogen (designated generally as "$NO_x$") produced when the coal is combusted. These $NO_x$ are an acid rain precursor pollutant and the minimization thereof is desirable. The minimization of $NO_x$ production during coal combustion follows directly from a reduction in the amount of nitrogen present in the coal that is combusted.

What is needed is a method of desulfurizing and denitrifying coal which is efficient, cost effective, and which satisfies environmental concerns.

SUMMARY OF THE INVENTION

The present invention is directed to an apparatus and process for desulfurizing and denitrifying coal by pyrolysis and subsequently treating the gaseous pyrolysis by-products with a solid sorbent to substantially reduce the release of $SO_x$ gases to acceptable levels, while at the same time reducing waste sorbent volume by maximizing the utilization of solid sorbent particles.

In one aspect of the invention, coal is pyrolized in the inner chamber of the desulfurization and denitrification apparatus to drive off the sulfur and nitrogen compounds contained therein. In another aspect of the invention, the gaseous by-products of pyrolysis, which includes hydrogen sulfide and carbonyl sulfide, are treated with a suitable solid sorbent in the outer chamber of the desulfurization and denitrification apparatus to substantially desulfurize those gases. In a further aspect of the invention, the desulfurized gases, which contain molecular nitrogen ($N_2$), ammonia ($NH_3$), and other organic nitrogen compounds produced during pyrolysis, are combusted under controlled conditions to minimize the production of $NO_x$.

BRIEF DESCRIPTION OF THE DRAWINGS

The Figure is a side elevation, in partial cross section, of one embodiment of the apparatus of the present invention.

DETAILED DESCRIPTION

In a preferred embodiment, and with reference to the Figure, the coal desulfurization and denitrification apparatus 10 of the present invention has an inner chamber 12 and an outer chamber 14 that is coaxial with inner chamber 12. A longitudinal auger 16 extends through inner chamber 12 and is rotatably disposed therein. Outer chamber 14 has a helical blade 18 rotatably disposed therein. Additionally, apparatus 10 includes a suitable heating mechanism 20 adjacent outer chamber 14 to heat outer chamber 14, and, by means of heat transferred through outer chamber 14, to heat inner chamber 12.

In operation, coal is introduced into one end of heated inner chamber 12 and pyrolized as it is transferred along the length thereof by rotating auger 16. The gaseous by-products of the pyrolysis, as well as the pyrolized coal, are discharged from the opposite end of inner chamber 12, whereupon the pyrolized coal is collected for subsequent use and the gaseous pyrolysis by-products are introduced into heated outer chamber 14. A suitable solid sorbent is simultaneously introduced into outer chamber 14 to desulfurize the gaseous pyrolysis by-products as the rotating helical blade 18 transfers the solid sorbent and the gases along the length of outer chamber 14. The spent sorbent and desulfurized gases (which still contain gaseous or vaporous nitrogen compounds produced during pyrolysis) are then discharged from outer chamber 14 through suitable outlets.

Inner chamber 12 includes a tubular midsection 22, a fixed end cap 24 at one end and a plate 38 at the opposite end. Cap 24 includes an outwardly-flared edge 26 adapted to receive an edge 28 of tube 22. Separating the edges 26 and 28 is a suitable packing material, which permits section 22 to rotate relative to cap 24. Additionally, cap 24 has an inlet opening 30 through which coal pellets are charged into inner chamber 12 via coal feed tube 32. The coal may be supplied to desulfurization and denitrification apparatus 10 manually or by any suitable mechanical means, such as a conveyor or secondary screw feeder (not shown).

End plate 38 defines the end of chamber 14. End plate 38 is preferably a metal plate with a plurality of apertures 40 sized to permit the discharge of the solid particles and gases from rotatable tube 22. Generally, the apertures are about ¼" or larger. Both end plate 38 and end wall 42 of cap 24 have central bearings 44, 46, respectively, for receiving an end of shaft 36 of longitudinal auger 16. Bearings 44 and 46 permit free rotation of longitudinal auger 16 relative to the chamber 14, while providing a seal which prevents the discharge of solids or gases from chamber 12 at that location.

Auger 16 acts as a scraper to keep the inner surface 34 of tube 22 relatively free of coal deposits, thus facilitating heat transfer into inner chamber 12. Longitudinal auger 16 is rotated by any appropriate drive means, such as a motor drive (not shown), which is operably connected to shaft 36 of screw 16.

Outer cylindrical chamber 14 is coaxial with inner chamber 12. This chamber 14 includes two end walls 50 and 52, and a cylindrical housing 48. End walls 50, 52 of housing 48 each have central apertures 56 and 58, respectively, sized to receive rotatable tube 22. Apertures 56, 58 are each preferably provided with an annular bearing 60 and 62 which separate the outer surface 54 of rotatable tube 22 from end walls 50 and 52. Bearings 60 and 62 also provide a seal between surface 54 and end walls 50 and 52 preventing the discharge of solids or gases from outer chamber 14.

Outer chamber 14 also includes a helical blade 18 disposed therein. Blade 18 is welded or otherwise fixed to the outer surface 54 of rotatable tube 22 so that blade 18 rotates as tube 22 is rotated. As shown in the figure, a chain drive mechanism designated generally as 63 rotates chamber 22 and thus blade 18. Rotation of blade 18 scrapes the inner surface 64 of chamber 14 to keep it relatively free of deposits, thus facilitating heat transfer through chamber 14.

Chamber 14 has an inlet opening 66 preferably adjacent end wall 52 through which solid sorbent is charged into outer chamber 14 via sorbent feed tube 68. Chamber 14 additionally includes a lower outlet opening 70 and upper gas outlet opening 72, preferably adjacent end wall 50. Spent sorbent is discharged through opening 70 while desulfurized gases pass through opening 72. Spent sorbent outlet opening 70 preferably has an outlet tube 74 directing the spent sorbent to a collecting bin or a sorbent regeneration unit designated generally as 76. Gas outlet opening 72 preferably has an outlet tube 78 for transferring the desulfurized gas to additional apparatus (not shown), such as a heat exchanger to remove the latent heat, or other apparatus to further process the gas, such as a conventional boiler wherein the gases and vapors are combusted.

As shown in the Figure, desulfurization and denitrification apparatus 10 preferably has a receiving chamber 80 integral with chamber 14 adjacent end wall 52 thereof. Chamber 80 communicates with inner chamber 1 via apertures 40 in end plate 38 of tube 22 and receives the pyrolized coal and gaseous by-products discharged therethrough. The pyrolized coal is funneled into a receiving bin 82 for subsequent use, or may be transferred directly to subsequent processing apparatus (not shown), such as a coal gasifier or combustor. End wall 52 of outer chamber 14 has a plurality of apertures 84 therein, preferably in the region below rotating tube 22, through which chamber 80 communicates with outer chamber 14, and through which the gaseous pyrolysis by-products enter outer chamber 14.

Finally, desulfurization and denitrification apparatus 10 includes a heating mechanism designated generally as 20, which is preferably an electric coil heater, but may be any other type of suitable heating apparatus. Heater 20 supplies heat to chamber 14. Inner chamber 12 is heated, by means of heat transferred through outer chamber 14. Since inner chamber 12 is heated by heat transferred from heater 20 through outer chamber 14, the temperature in outer chamber 14 is a function of the desired temperature in inner chamber 12. Suitable water cooling jackets may be attached to end walls 50 and 52 to protect bearings 60, 62, 44 and 46.

To use apparatus 10 to desulfurize and denitrify coal, inner and outer chambers 12 and 14 are heated to their appropriate operating temperatures by heater 20. Inner chamber 12 is preferably heated to approximately 400°-550° C. and preferably 500° C., which has been determined to be significant in the coal pyrolysis step. Heating inner chamber 12 to temperatures significantly higher than 500° C. causes charring of the coal, which is undesirable because it prevents the release of sulfur. Heating inner chamber 12 to temperatures significantly lower than 500° C. does not release a sufficient amount of the sulfur, which is also undesirable. In order to maintain inner chamber 12 of the preferred apparatus at about 500° C. it is necessary to heat outer chamber 14 to between about 600°-700° C., with 700° C. being the preferred operating temperature in outer chamber 14.

Coal pellets are introduced into inner chamber 12 via coal feed tube 32. In addition, a relatively small amount (between about 0.1-2%) of calcium oxide (CaO) or calcium carbonate ($CaCO_3$) may be introduced into inner chamber 12 along with the coal pellets to reduce the caking, swelling and sintering of the coal, which tends to occur at or about 500° C. Auger 16 is rotated to push the coal along the length of inner chamber 12 toward end plate 38. Tube 22 is also rotated in the opposite direction of the rotation of auger 16 to aid in the transfer of material along the length of inner chamber 12 and to rotate helical blade 18. Due to the temperature in inner chamber 12, the coal is pyrolized as it is transferred by auger 16, thus producing primarily hydrogen sulfide (H₂S) and carbonyl sulfide (COS), as well as molecular nitrogen (N₂), ammonia (NH₃) and other organic nitrogen compounds, as the gaseous pyrolysis by-products. The pyrolized coal and gaseous by-products are discharged from inner chamber 12 through apertures 40 in end plate 38 into receiving chamber 80.

Once received in chamber 80, the pyrolized coal is funneled into a receiving bin 82, or to some other processing/conveying apparatus, not shown. The coal acts as a plug at the bottom of receiving chamber 80 along with a suitable mechanical locking valve (not shown) and thereby prevents the discharge of the gaseous pyrolysis by-products into receiving bin 82. Pressure forces gaseous by-products into outer chamber 14 through apertures 84 in end wall 52. Solid sorbent is charged into outer chamber 14 through inlet opening 66 via sorbent feed tube 68. The sorbents adsorb sulfur contained in the gaseous by-products passing through chamber 14.

Desulfurization of the gaseous pyrolysis by-products requires a sorbent which reacts with the H₂S and COS present therein to remove the sulfur. A preferred sorbent which will accomplish this is limestone (CaCO₃) which has been precalcined to calcium oxide (CaO). Alternatively, CaCO₃ may be used in that form, as it may be calcined in situ to form CaO. The calcium oxide is fed to outer chamber 14 in pellet form and is in intimate contact with the gaseous by-products as both are transferred along outer chamber 14 by blade 18, which rotates as tube 22 is rotated. Virtually complete utilization of this calcium-based sorbent is achieved by reacting the CaO with the H₂S and COS in a reducing (i.e., oxygen-poor) environment since the molar volume of the reaction product, calcium sulfide (CaS), is not a limiting factor. The desulfurization of H₂S and COS occurs according to the following reactions:

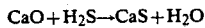

$CaO + H_2S \rightarrow CaS + H_2O$

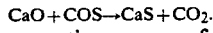

$CaO + COS \rightarrow CaS + CO_2$.

These reactions are preferably carried out at temperatures of about 700° C. and result in the conversion of about 90% or more of the CaO to CaS. Since the reaction of CaO and H₂S follows first order kinetics with respect to the H₂S concentration, the reaction time is shortened as the concentration of H₂S is increased. Thus, by operating desulfurization and denitrification apparatus 10 without any appreciable air/oxygen present, desulfurization is maximized.

Apparatus 10 is operated without the introduction of air/oxygen above and beyond that which is carried into the apparatus when the coal and sorbent are charged into the inner and outer chambers 12 and 14, respectively. The volume of air entering the system in this manner is negligible when compared to the volume of gaseous by-products produced during pyrolysis.

By the action of helical blade 18, the solid sorbent and gaseous pyrolysis by-products are transferred along the length of outer chamber 14 as the desulfurization reactions occur. Spent sorbent and any unused sorbent is discharged from outer chamber 14 through outlet opening 70. The spent sorbent, CaS, can be subsequently regenerated to CaO in a separate operation, not shown, and reused, thus decreasing the overall solid waste output. The desulfurized pyrolysis gaseous by-products, including CO₂ and H₂O vapor, any residual H₂S and COS, and N₂, NH₃ and other organic nitrogen compounds, are discharged from outer chamber 14 through outlet opening 72. Thereafter, these gases may be transferred to a subsequent apparatus (not shown) for further processing, if desired.

One contemplated use for the gases and vapors discharged through outlet opening 72 is the combustion thereof in a conventional boiler (not shown) at an over-fire air port rather than at the primary (fuel rich) fuel injection port. This is advantageous in that the combustion gas temperature at the over-fire air port is significantly lower than that at the primary fuel injection port, thus resulting in less conversion to NO_x of the nitrogen compounds present in the gaseous pyrolysis by-products than that which would occur if the coal was not pyrolyzed and the nitrogen compounds had remained in the coal until combustion.

The above-described process and apparatus of the present invention provides numerous benefits. Since the desulfurization reactions take place in a reducing atmosphere in outer chamber 14, virtually complete conversion of CaO to CaS is possible. Unlike the conventional dry-sorbent flue-gas-desulfurization system, where the practical residence time of sorbent particles is limited to approximately two seconds, the residence time of CaO particles in the reaction zone in outer chamber 14 does not have such a limitation. The desulfurization reactions in the method of the present invention take place before large volumes of air and/or combusted gas dilute the sulfur concentration and are thus inherently more efficient than conventional flue-gas desulfurization methods. This is because in the conventional methods the sulfur-containing compounds are diluted by large volumes of air and combusted gas products.

In addition, the method and apparatus of the present invention make efficient use of heat by utilizing the coaxial chamber design, where hotter sorbent particles are on the "shell" side moving countercurrently with the coal particles on the "tube" side. The problems associated with caking and swelling of the coal particles are minimized by the mechanical movement of auger 16; the addition of a small amount of CaO or CaCO₃ particles is also effective in preventing caking and swelling during pyrolysis. The desulfurization and denitrification apparatus of the present invention could be easily used to retrofit existing coal combustors and coal gasifiers by replacing existing coal feeders and, since the spent sorbent (CaS) can be regenerated to CaO, the apparatus will reduce the output of solid waste.

It will be appreciated by persons skilled in the art that the method and apparatus of the present invention described herein, which have been described in their preferred form, may be modified or altered without departing from the scope of the invention, which is to be determined from the appended claims.

What is claimed is:

1. A method of desulfurizing coal comprising:
   introducing coal into a first end of an inner chamber;
   introducing solid sorbent particles into a first end of an outer chamber surrounding and in contact with said inner chamber;
   heating said outer chamber to an effective temperature, whereby said coal in said inner chamber is heated to an effective temperature to pyrolyze said coal, thereby producing gaseous sulfur-containing by-products; and introducing said gaseous sulfur-containing by-products into said outer chamber to contact said gaseous by-products with said solid sorbent particles in a reducing environment to effectively remove the sulfur from said gaseous by-products.

2. The method of claim 1 further comprising transferring said coal from said first end of said inner chamber to a second end of said inner chamber as said coal is pyrolized.

3. The method of claim 2 further comprising introducing a quantity of solid sorbent particles into said inner chamber along with said coal sufficient to substantially prevent swelling, caking and sintering of said coal as it is pyrolized.

4. The method of claim 3 wherein said solid sorbent particles are calcium oxide particles.

5. The method of claim 3 wherein said solid sorbent particles are calcium carbonate particles.

6. The method of claim 1 wherein said effective temperature to which said outer chamber is heated is between about 500°–700° C.

7. The method of claim 1 wherein said effective temperature to which said inner chamber is heated is about 500° C.

8. The method of claim 1 further comprising transferring said solid sorbent particles from said first end of said outer chamber to a second end of said outer chamber as the sulfur is removed from said gaseous by-products.

9. A method of desulfurizing coal, comprising:
introducing coal into a first end of an inner chamber;
introducing solid sorbent particles into a first end of an outer chamber surrounding and in contact with said inner chamber;
heating said outer chamber to between about 500°–700° C., whereby said coal in said inner chamber is heated to about 500° C. to pyrolyze said coal, thereby producing gaseous sulfur-containing by-products;
introducing said gaseous sulfur-containing by-products into said outer chamber to contact said gaseous by-products with said solid sorbent particles in a reducing environment to effectively remove the sulfur from said by-products;
transferring said coal from said first end of said inner chamber to a second end of said inner chamber as said coal is pyrolized; and
transferring said solid sorbent particles from said first end of said outer chamber to a second end of said outer chamber as the sulfur is removed from said gaseous by-products.

10. The method of claim 9 further comprising introducing a quantity of said sorbent particles into said inner chamber along with said coal sufficient to substantially prevent swelling, caking and sintering of said coal as it is pyrolized.

11. The method of claim 10 wherein said solid sorbent particles are calcium oxide particles.

12. The method of claim 10 wherein said solid sorbent particles are calcium carbonate particles.

13. A method of desulfurizing and denitrifying coal comprising:
introducing coal into a first end of an inner chamber;
introducing solid sorbent particles into a first end of an outer chamber surrounding and in contact with said inner chamber;
heating said outer chamber to an effective temperature, whereby said coal in said inner chamber is heated to an effective temperature to pyrolyze said coal, thereby producing gaseous sulfur-containing and nitrogen containing by-products; and
introducing said gaseous sulfur-containing by-products into said outer chamber to contact said gaseous by-products with said solid sorbent particles in a reducing environment to effectively remove the sulfur from said gaseous by-products.

14. A method of desulfurizing and denitrifying coal, comprising:
introducing coal into a first end of an inner chamber;
introducing solid sorbent particles into a first end of an outer chamber surrounding and in contact with said inner chamber;
heating said outer chamber to between about 500°–700° C., whereby said coal in said inner chamber is heated to about 500° C. to pyrolyze said coal, thereby producing gaseous sulfur-containing and nitrogen-containing by-products;
introducing said gaseous sulfur-containing and nitrogen-containing by-products into said outer chamber to contact said gaseous by-products with said solid sorbent particles in a reducing environment to effectively remove the sulfur from said by-products;
transferring said coal from said first end of said inner chamber to a second end of said inner chamber as said coal is pyrolized; and
transferring said solid sorbent particles from said first end of said outer chamber to a second end of said outer chamber as the sulfur is removed from said gaseous by-products.

* * * * *